(12) United States Patent
Ciarniello

(10) Patent No.: US 12,470,311 B2
(45) Date of Patent: Nov. 11, 2025

(54) ADVERTISING AUDIENCE MONITORING IN A CONTENT DISTRIBUTION SYSTEM

(71) Applicant: Telecom Italia S.p.A., Milan (IT)

(72) Inventor: Alberto Ciarniello, Rome (IT)

(73) Assignee: Telecom Italia S.p.A., Milan (IT)

( * ) Notice: Subject to any disclaimer, the term of this patent is extended or adjusted under 35 U.S.C. 154(b) by 388 days.

(21) Appl. No.: 18/013,186

(22) PCT Filed: Jun. 30, 2021

(86) PCT No.: PCT/EP2021/067962
§ 371 (c)(1),
(2) Date: Dec. 27, 2022

(87) PCT Pub. No.: WO2022/003006
PCT Pub. Date: Jan. 6, 2022

(65) Prior Publication Data
US 2023/0299863 A1  Sep. 21, 2023

(30) Foreign Application Priority Data
Jun. 30, 2020  (IT) .............. 102020000015781

(51) Int. Cl.
*H04H 60/51* (2008.01)
*H04H 60/37* (2008.01)
*H04H 60/45* (2008.01)

(52) U.S. Cl.
CPC .......... *H04H 60/375* (2013.01); *H04H 60/45* (2013.01); *H04H 2201/20* (2013.01)

(58) Field of Classification Search
CPC .. H04H 60/375; H04H 60/45; H04H 2201/20; H04H 20/93; H04H 60/51;
(Continued)

(56) References Cited

U.S. PATENT DOCUMENTS 7,751,811 B2 * 7/2010 Ritter .............. H04H 60/51
455/423
8,813,131 B2  8/2014  Han et al.
(Continued)

FOREIGN PATENT DOCUMENTS

DE  202020102837  *  5/2020
DE  202020102837 U1  6/2020
(Continued)

OTHER PUBLICATIONS

Oct. 21, 2021—(WO) International Search Report and Written Opinion—App PCT/EP2021/067962.

*Primary Examiner* — Angelica Perez
(74) *Attorney, Agent, or Firm* — Banner & Witcoff, Ltd.

(57) ABSTRACT

A method is disclosed for monitoring the audience of an advertisement over a content distribution system, the advertisement comprising an advertising message associated with an audio content. The method comprises: inserting, within the message, an advertising identifier associated with the advertisement and distributing the audio content with the advertising message to a user of the content distribution system; at a first user device configured to receive the audio content, playing the audio content with the advertising message; at a second user device connected to the first user device and configured to communicate with a data collection server over a data communication network, retrieving a customer identifier uniquely associated with the user; and, during or after playing, sending by the second user device the customer identifier and the advertising identifier extracted from the advertising message to the server to monitor the audience of the advertising message.

15 Claims, 2 Drawing Sheets

(58) Field of Classification Search
CPC .... H04H 60/64; H04H 60/66; H04H 2201/37; H04H 20/14
See application file for complete search history.

(56) References Cited

U.S. PATENT DOCUMENTS

| | | | |
|---|---|---|---|
| 9,619,812 B2* | 4/2017 | Balasubramanian | .. G06Q 30/02 |
| 9,936,249 B1* | 4/2018 | Nelson | H04N 21/4126 |
| 2019/0213214 A1* | 7/2019 | Schalkwijk | G10L 25/51 |
| 2019/0373309 A1* | 12/2019 | Fahnestock | H04N 21/8106 |
| 2020/0204849 A1* | 6/2020 | Loheide | H04N 21/2187 |
| 2021/0406232 A1* | 12/2021 | Sheppard | H04N 21/812 |
| 2022/0414714 A1* | 12/2022 | Maher | G06Q 30/0276 |

FOREIGN PATENT DOCUMENTS

| | | | |
|---|---|---|---|
| WO | 2019008612 | * | 1/2019 |
| WO | 2019008612 A1 | | 1/2019 |

* cited by examiner

ADVERTISING AUDIENCE MONITORING IN A CONTENT DISTRIBUTION SYSTEM

TECHNICAL FIELD

The present invention relates to the field of telecommunications. In particular, the present invention relates to the field of content distribution systems such as digital audio broadcasting systems. More in particular, the present invention relates to a method for monitoring the audience of an advertisement over a content distribution system, in particular—but not exclusively—a digital audio broadcasting system.

BACKGROUND ART

The diffusion of an audio content distributed free of charge through a broadcasting system is normally financially supported by the diffusion of advertising messages associated with the content itself. Today, the transition from analogue audio broadcasting systems (Amplitude and Frequency Modulation, AM and FM) to digital audio broadcasting systems is underway. However, this does not seem likely to significantly change the business model of commercial radio stations. Digital Audio Broadcasting (DAB) or Digital Audio Broadcasting Plus (DAB+) are the radio transmission technologies that nowadays support the digital radio broadcasts.

Typically, the time slots allocated for advertising during audio programming are managed by each single radio station. The radio programming often contains advertising messages designed to be broadcast by a multiplicity of radio stations as part of an advertising campaign, which is meant to increase the visibility of a given product/good/service.

In the field of digital video broadcasting systems, different methods have been developed to increase the effectiveness of advertisements.

For instance, U.S. Pat. No. 8,813,131 B2 discloses a method and an apparatus of interactive advertising service. The method includes: receiving first advertising contents from a broadcasting advertisement platform; displaying broadcasting according to the first advertising contents on the overall screen together with at least one second advertisement contents interactive indicator indicating that the first advertising contents are linked with second advertising contents; receiving indicated information triggering at least one second advertising contents interactive indicator from an input device; receiving the second advertising contents indicated by the at least one second advertising contents interactive indicator from the broadcasting advertisement platform; and displaying broadcasting according to the second advertisement contents. According to an exemplary embodiment, it is possible to introduce opportunity of goods information acquisition and purchasing behaviours distributed to media other than broadcasting into a smart TV while improving concentration for advertisements in bidirectional digital broadcast.

SUMMARY OF THE INVENTION

For the participants in the advertising market (i.e. companies, agencies, brands, etc.), the problem of measuring the reach and effectiveness of their advertising messages arises, which means, for instance, measuring the size of the audience actually reached by the advertisement and/or the level of engagement achievable by the advertisement (which is related to the capability of attracting the user's attention). In particular, measuring the diffusion of an advertisement in principle requires first measuring how many customers are actually reached by the advertisement that they listen to while reached by an audio content, and then measuring how many customers are interested in the advertisement. This provides a key metric about the potential and value of the advertisement itself. Besides, a measure of the level of engagement can be provided when, beyond checking that the user has actually listened to the advertisement, it is possible to check whether the user performs further actions to get more information about the product/good/service which is advertised (for instance, navigate a related website).

However, digital broadcasting systems do not allow to track an advertisement associated with a distributed digital audio content, namely, to check whether each single customer potentially reachable by the distributed digital audio content really listens to the advertisement. Hence, digital broadcasting systems allow neither a direct and objective measurement of the diffusion of the advertising message (i.e., for instance, a measurement of the actual size of the audience reached by the advertising message) nor a collection of essential information that can be useful to enhance the effectiveness of the advertising message, such as location information (e.g. city) of the customer who listened to the advertising message.

In addition, digital broadcasting systems do not allow any type of interactivity with end customers, even after the customers received the advertising message.

Moreover, the inventor noticed that the state-of-the-art methods used in the field of digital video broadcasting systems for increasing the effectiveness of advertisements are not useful to overcome the drawbacks highlighted above. Indeed, methods such as the method described in U.S. Pat. No. 8,813,131 B2 do not provide for measuring the diffusion of an advertisement. It is further to be noticed that the television is, by its nature, a shared medium, which means that in principle it is difficult (and possibly even not of interest for television advertisers) to track advertisements on a single customer basis.

In the light of the above, the Applicant has tackled the problem of providing a method for monitoring the audience of an advertisement over a content distribution system, in particular—but not exclusively—a digital audio broadcasting system, which allows tracking an advertisement associated with an audio content on a single customer basis.

In the following description and in the claims, the expression "monitoring the audience of an advertisement" or "monitoring the audience of an advertising message" will refer to the operations related to measuring the reach and effectiveness of the advertising message In the present description and in the claims, the expression "audio content" will indicate any type of information that is consumed through listening. A specific audio content, within the meaning of the present invention, may relate to information comprising music, such as a single song or a collection of songs, or speech. Further, it may relate to a radio program or radio show of a specific duration comprising news and/or music and/or talks or the like. Even further, it may relate to a podcast, an audiobook, etc. It may also relate to the audio portion of a combined audio and video content, e.g., a television content or other audio/video content.

According to a first aspect, the present invention provides a method for monitoring the audience of an advertisement over a content distribution system, wherein the advertisement comprises an advertising message associated with an audio content, the method comprising:

a) inserting within the advertising message an advertising identifier associated with the advertisement and distributing the digital audio content with the advertising message to a user of the content distribution system;
b) at a first user device configured to receive the digital audio content, playing the digital audio content with the advertising message;
c) at a second user device connected to the first user device and configured to communicate with a data collection server over a data communication network, retrieving a customer identifier uniquely associated with the user; and
d) during or after playing, sending by the second user device the customer identifier and the advertising identifier extracted from said advertising message to the data collection server to monitor the audience of the advertising message.

Preferably, the audio content is associated with a station identifier, comprising an identifier of a radio station currently distributing the audio content, and a program identifier comprising an identifier of a radio program corresponding to the audio content.

Preferably, step c) further comprises retrieving a timing information comprising the date and the time of the day indicating when the advertising message actually reached the user and a device positioning information comprising localization data indicating the position of the user at date and time of the day indicated by the timing information.

Preferably, step d) further comprises sending to the data collection server the timing information and the device positioning information in association with the advertising identifier and the customer identifier.

Preferably, the customer identifier is derived from a subscriber identity module housed in the second user device. More in particular, the customer identifier may be recovered from the international mobile subscriber identity or the integrated circuit card id associated with the subscriber identity module. Preferably, the customer identifier is obtained by applying a cryptographic algorithm to the international mobile subscriber identity or the integrated circuit card id associated with the subscriber identity module.

Alternatively, the customer identifier is obtained from a software application installed on the second user device and is randomly assigned to the user.

Preferably, step c) further comprises retrieving a server identifier comprising an address of the data collection server from the subscriber identity module housed in the second user device.

Preferably, the advertising identifier comprises an identifier of a content access server providing advertising access data to access additional contents correlated with the advertisement.

Preferably, the advertising access data comprise an address of an advertising distribution server providing the additional content, and the method further comprises automatically starting a browser module of the second user device to access the advertising distribution server by means of the address.

Preferably, the method further comprises, at the data collection server, generating an audience analysis report with audience data associated with the advertising identifier.

Preferably, the audio content is a digital audio broadcasting content and inserting within the advertising message an advertising identifier associated with the advertisement comprises inserting the advertising identifier in the PAD field of a number of audio frames transporting the digital audio broadcasting content.

According to a second aspect, the present invention provides a system for monitoring the audience of an advertisement over a content distribution system, wherein the advertisement comprises an advertising message associated with an audio content distributed to a user of the content distribution system, the system comprising a first user device, a second user device connected to the first user device and a data collection server being configured to communicate with the second user device over a data communication network, the first user device being configured to:
  receive the digital audio content; and
  play the digital audio content with the advertising message, and the second user device being configured to:
  retrieve a customer identifier uniquely associated with the user;
  during or after playing, send the customer identifier and an advertising identifier extracted from the advertising message to the data collection server to monitor the audience of the advertising message.

According to a third aspect, the present invention provides an apparatus for monitoring the audience an advertisement over a content distribution system, wherein the advertisement comprises an advertising message associated with an audio content distributed to a user of the content distribution system, the apparatus comprising a first user device and a second user device, wherein the first user device is configured to:
  receive the digital audio content; and
  play the digital audio content with the advertising message,
  and the second user device is configured to:
  retrieve a customer identifier uniquely associated with the user;
  during or after playing, send the customer identifier and an advertising identifier extracted from the advertising message to a data collection server to monitor the audience of the advertising message, the data collection server being configured to communicate with the second user device over a data communication network.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
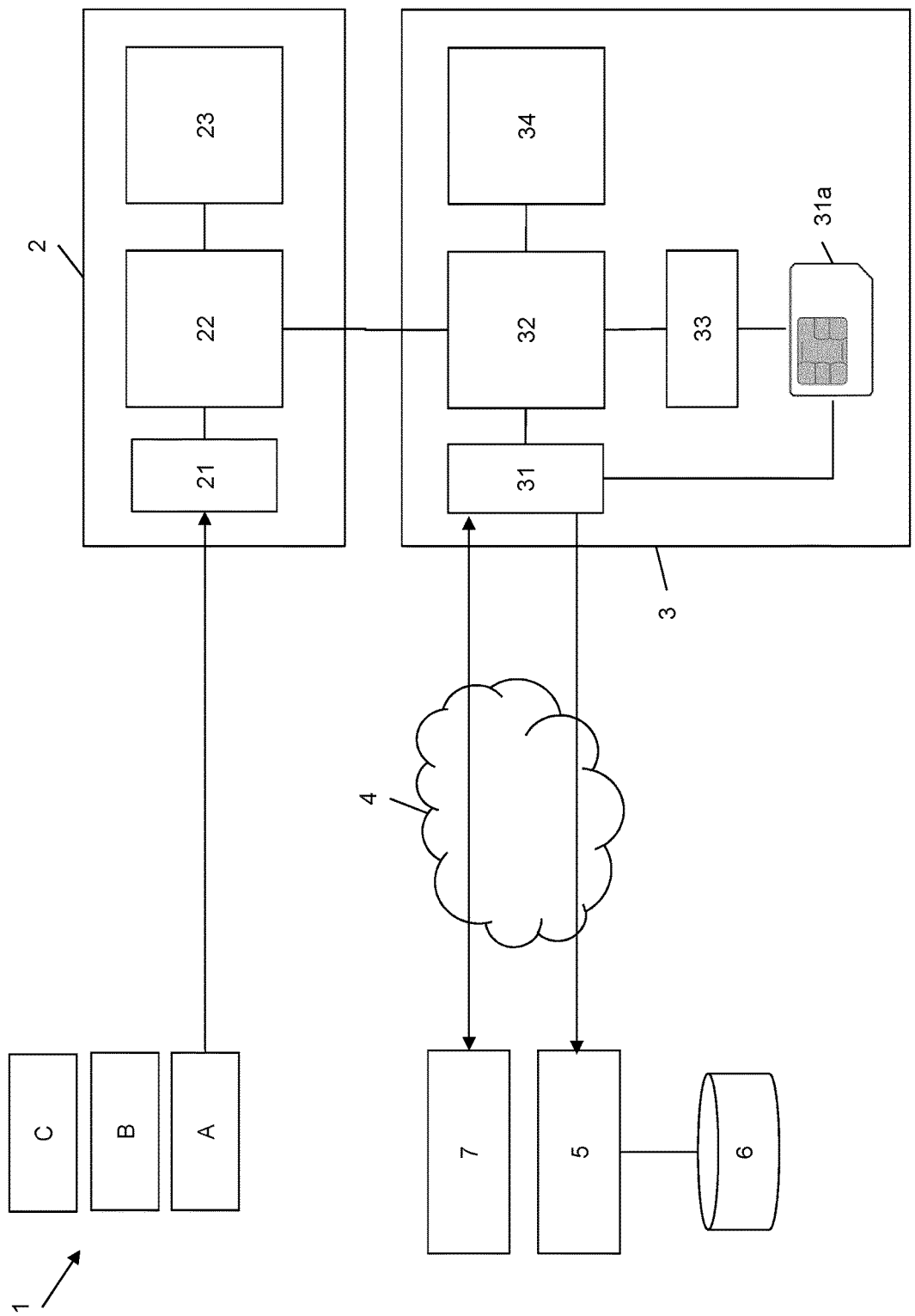
FIG. 1 schematically illustrates an exemplary scenario of application of the method of the present invention.

FIG. 1 schematically illustrates an exemplary scenario of application of the method according to the present invention. In this scenario, a plurality of radio stations 1, e.g. three radio stations in FIG. 1, which will be indicated with letters "A", "B", and "C", are distributing audio contents, in particular, for instance, digital audio contents. It is assumed that an advertiser (e.g. an advertising agency, on behalf on a product manufacturer) is programming an advertising campaign over the broadcasts of the radio stations for advertising, e.g., a new product. The advertising campaign comprises a number of advertising messages to be inserted within the radio programs distributed by the radio stations.

According to the present invention, an advertising audience monitoring service is provided to monitor the audience of advertising messages of the considered advertising campaign, in particular to provide measurements related to their diffusion and effectiveness.

According to preferred embodiments of the present invention, the advertiser is generating an advertising identifier (or, advertising ID) uniquely associated with the advertising campaign and is sending the generated advertising ID to the radio stations for associating it with one or more advertising messages distributed with an audio content, as it will be described herein after.

Once the radio station receives the advertising ID uniquely associated with the advertising campaign, each time an advertising message belonging to the considered advertising campaign is broadcasted within the audio content distributed by the radio station, the advertising ID is preferably inserted within the digital broadcasting stream carrying the advertising message by exploiting methods made available according to different technologies—such as, for instance, by using the Programme Associated Data (PAD) field for the DAB/DAB+ technology—as it will be described herein after. The advertising ID optionally comprises an information useful to access additional contents correlated to the advertising campaign. In particular, the advertising ID may contain an identifier (e.g. a pointer to an address) of a content access server providing access to a resource which is hosting a website allowing the user to access such additional contents.

Distribution of the audio contents and the associated advertisements takes place over a content distribution system providing a content distribution service, in particular a digital audio broadcasting (DAB) system providing a digital audio broadcasting service. It is to be noticed that in the following description reference will be made to a DAB system merely for sake of non-limiting example. Indeed, the method of the present invention may similarly be applied to other content distribution systems, for instance systems based on digital audio services provided via the Internet (e.g. web radio, podcast services, etc.). The method may also be applied with reference to the audio component of an audio/video system by using either auxiliary data frames provided by the audio/video digital broadcasting system—for instance, a DVB-T2 (Digital Video Broadcasting—Second Generation Terrestrial) system—or audio watermarking techniques allowing synchronised injection and extraction of data into the audio channel. The method may further be applied with reference to an audio content which is distributed by a conventional (analog) radio broadcasting system (e.g. a FM broadcasting system) by applying the audio watermarking techniques mentioned above.

According to the scheme of FIG. 1, a digital audio content is distributed by a radio station, e.g. radio station A, to a user or customer of the DAB service. The audio content comprises an advertisement or advertising message. The user is provided with a first user device 2 and a second user device 3.

The first user device 2 comprises a receiver 21, in particular a DAB receiver, configured to receive and process (e.g. decode) a digital signal carrying the audio content distributed by the radio station A. The first user device 2 also comprises hardware and software modules configured to make the audio content available for consumption by the user (e.g. a loudspeaker and/or a headset connector and associated controls).

The first user device 2 further preferably comprises a first processing module 22. The first processing module 22 is preferably a software module configured to process the digital signal including the audio content to extract therefrom a first set of data that are carried over the transmitted digital signal in synchronization with the audio content, as it will be described herein after.

Optionally, the first user device 2 may comprise a display 23 for the visualization of information associated with the audio content (e.g., typically, the name of the radio station, a title of the audio content that is playing, etc.).

The second user device 3 comprises a communication module 31 configured to connect the second user device 3 to a data communication network 4, e.g. a broadband data network 4 so that the second user device 3 can access the Internet. The communication module 31 may further be configured to connect the second user device 3 to a mobile communication network and hence to cooperate with a subscriber identity module (SIM) 31a storing at least one SIM identifier such as the International Mobile Subscriber Identity (IMSI). The subscriber identity module may be implemented as a stand-alone SIM card to be inserted in the second user device 3, as schematically represented in FIG. 1, or as an embedded SIM (eSIM).

Moreover, the second user device 3 preferably comprises a second processing module 32. The second processing module 32 is preferably a software module configured to receive, from the first processing module 22, the first set of data that are extracted from the audio content and associate them with a second set of data that are gathered locally at the second user device 3, as it will be described in detail herein after.

Optionally, the second user device 3 comprises a third processing module 33 configured to extract a portion of the second set of data from the subscriber identity module 31a, as it will be described in detail herein after.

The second processing module 32 and the optional third processing module 33 may be distinct software applications or part of a single software application running on the second user device 3, which may be provided (e.g. pre-installed in the second user device upon purchase) by the manufacturer of the second user device 3 to manage the considered content distribution service, namely, according to the exemplary situation described so far, the DAB service The second user device 3 may also comprise a software application module 34 comprising a browser to navigate the Internet. This module will be referred to as, for simplicity, browser module.

The second user device 3 comprises other software and/or hardware components (such as, for instance a CPU, a memory, a battery, a GNSS—Global Navigation Satellite System—module, e.g. a GPS—Global Positioning System—module, etc.), whose detailed description will be omitted since it is not relevant to the present invention.

The first user device 2 and the second user device 3 may be separate independent devices connectable to each other either via a wired connection or a wireless connection, for instance a short-range wireless connection (e.g. Bluetooth, Wi-Fi, etc.). Alternatively, they may be integrated into a single apparatus (e.g. a smartphone integrating a DAB receiver). According to a further example of implementation, the first user device may be a DAB receiver mounted on a car and the second user device may be a smartphone, which is connectable via, e.g., the Bluetooth technology, to the DAB receiver in the car. For instance, the smartphone may automatically connect to the DAB receiver when the user enters the car and uses the radio.

It is to be noticed that according to further examples of implementation (which may be considered, for instance, when the audio content is distributed by a conventional radio broadcasting system), the first user device may be a radio receiver (an FM radio receiver, or a device incorporating both the FM receiver and a DAB receiver) and the second user device may be a smartphone which is connectable to the radio receiver(s); alternatively, the two devices may be integrated in a single apparatus, e.g. a smartphone integrating the radio receiver(s).

Figure 2:
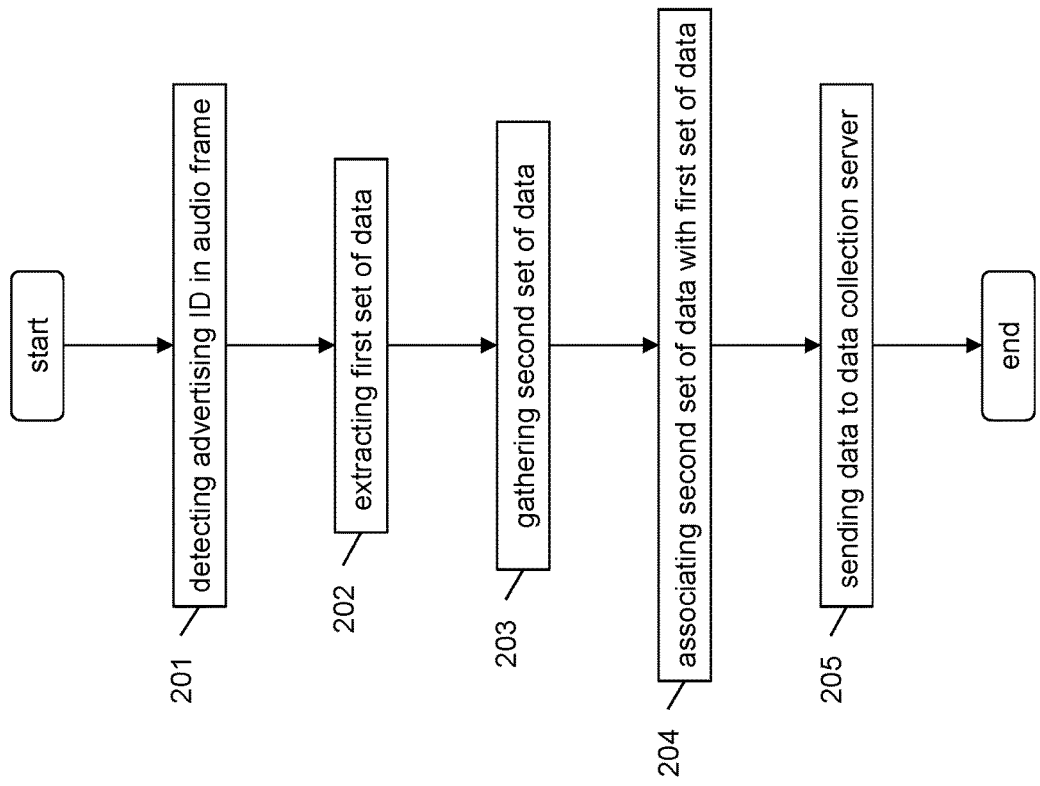
FIG. 2 is a flowchart of the steps of the method according to the present invention.

In the following description, the method according to some embodiments of the present invention will be described in detail. Reference will be made to the flowchart of FIG. 2, which illustrates the steps of the method performed at the first user device 2 and the second user device 3.

According to embodiments the present invention, the radio station A is broadcasting a program comprising an audio content, and a portion of the audio content comprises the advertising message. The advertising ID is preferably carried by the digital signal that conveys also the audio content and is synchronous with the audio content. In particular, the advertising ID is incorporated within the digital broadcasting stream carrying the audio content.

In particular, the considered DAB system is broadcasting the digital audio content by streaming a sequence of data frames. The present invention provides for inserting the advertising ID by exploiting methods made available according to different technologies (such as, for instance, by using the PAD field for the DAB/DAB+technology). The PAD field provided by the DAB/DAB+ technology, for instance, carries information which is synchronous to the audio content and which may be intimately related to it. The PAD, in particular, is a channel consisting of a stream of bytes transporting ancillary (i.e. non-mandatory) information closely related to the content carried in the audio frames in which the PAD is contained. The PAD consists of a fixed part (F-PAD) 2 bytes long and an extended part (X-PAD) which can have variable length. The PAD allows the broadcaster to transmit data containing information that supplements the audio content (such as, for instance, the title of a song, cover information from the album in which the song is included, information on the current programming of the radio station broadcasting the programme, etc.). A detailed description of the audio frame and the PAD in a DAB transmission can be found in the ETSI EN 300 401 V2.1.1 (2016 October) standard, "Radio Broadcasting Systems; Digital Audio Broadcasting (DAB) to mobile, portable and fixed receivers", sections 5.1 and 7.4. This document will be referred to as "DAB standard" in the following description. For sake of non limiting example, the following description will describe using the PAD field of the DAB/DAB+ audio frames for broadcasting the advertising ID.

According to embodiments of the present invention, the digital signal broadcasted by the radio station, for instance ratio station A as depicted in FIG. 1, preferably comprises a first set of data synchronous with the audio content, the first set of data comprising the following information:
  a station ID, comprising an identifier of the radio station currently broadcasting the audio content;
  a program ID, comprising an identifier of the radio program corresponding to the audio content; and
  the advertising ID, comprising an identifier of the advertising campaign.

According to embodiments of the present invention, the station ID is the station ID provided by the DAB standard, which is used by the DAB receiver to identify the name of the station (which typically is displayed to the user); according to the DAB standard, it is typically comprised in the Multiplex Configuration Information (MCI). Moreover, the program ID may be the program ID provided by the DAB standard, which may be comprised in the Service Information (SI). According to an embodiment of the present invention, the advertising ID is inserted into the PAD of the audio frames associated with the distributed advertising message.

At the first user device 2, the digital signal broadcasted by the radio station A is received by the DAB receiver 21. The DAB receiver preferably plays the digital audio content. In particular, at the DAB receiver 21, the digital signal is processed to recover the audio frames carried by the digital signal. This processing is a standard processing in a DAB receiver and hence will not be further described herein after. In parallel with the standard processing of the digital signal, the first processing module 22 preferably detects and extracts the first set of data listed above. In particular, upon reception of the audio frames at the DAB receiver 21, the first processing module 22 preferably checks the presence of the advertising ID within the PAD of each audio frame (step 201 in the flowchart of FIG. 2). The procedure of extraction of the first set of data (step 202) then starts when the advertising ID is detected in an audio frame. Then, the operations of checking the presence of the advertising ID and of extracting the first set of data are preferably performed in a continuous manner while the DAB receiver is playing the advertising message, which means, in other words, while the customer is listening to the advertising message. It is to be noticed that, in case the PAD field is used to transport the advertising ID, the entire advertising ID may be recovered after a number of subsequent audio frames is processed.

Upon extraction of the first set of data from the audio frames carrying the advertising message, the extracted data of the first set of data are preferably forwarded to the second processing module 32 of the second user device 3. Any of a plurality of means can be used to forward the first set of data to the second user device, a few examples are detailed further on in the present description. It is to be noticed that in case a sequence of advertising messages are transmitted together with the audio content, a respective first set of data is retrieved and forwarded to the second processing module 32 for each one of the advertising messages in the sequence.

It is to be noticed that, according to alternative embodiments, the extraction of the first set of data from the audio content carrying the advertising message may be made at the second user device 3. According to these embodiments, the distributed audio content is played at the first user device 2 by means of the radio receiver (either the DAB receiver or an FM receiver) and the second user device 3 is listening at the audio content by means of its microphone(s). The second user device 3 then processes the signal captured by the microphone(s) to retrieve the advertising ID (as well as the station ID and the program ID), which has been embedded in the audio content by means of, e.g., audio watermarking techniques. Alternatively, an analog signal associated with the audio content may be sent by the first user device 2 to the second user device 3 and processed at the second user device 3 to extract the advertising ID therefrom.

When the first set of data related to an advertising message are available at the second user device 3, the second processing module 32 preferably gathers a second set of data (step 203). Then, at the second processing module 32, the data of the first set of data are preferably associated with the data of the second set of data (step 204). The second set of data preferably comprises:

- a timing information, preferably comprising the date and the time of the day indicating when the advertising message actually reached the customer;
- a device positioning information preferably comprising localization data indicating the position of the customer (e.g. the city) at date and time of the day indicated by the timing information;
- a customer ID uniquely and anonymously associated with the customer who is listening to the audio content and, in particular, to the advertising message contained therein. The customer ID is anonymous and hence not related to the actual customer identity. Moreover, it is designed to distinguish the users from each other; and
- a server ID comprising an address of a data collection server 5 (see FIG. 1).

The timing information is an information that may be available at the second user device 3, as well as the positioning information. The timing information may for instance be available from a clock of the second user device 3. Moreover, for instance, the device positioning information may be gathered from a GPS (Global Positioning System) module of the second user device 3 and comprise the coordinates of the second user device 3. The timing information may be available, in alternatively or in addition, in the digital broadcasting stream.

It is to be noticed that the operation of making available data associated with the user device such as positioning data may be subject to the customer's consent according to the applicable regulations.

The customer ID as well as the server ID may be gathered by the second processing module 32 from a dedicated software module running on the second user device 3. The software module may be part of the software application associated with the DAB service and installed on the second user device 3. According to this embodiment, the customer IDs, each of which uniquely identifies a single customer, may be randomly assigned to all the customers of the DAB service.

According to another, advantageous, embodiment, the customer ID as well as the server ID may be stored in the SIM housed in the second user device 3 and extracted therefrom by the third processing module 33. In this case, the SIM may be remotely provisioned with the customer ID and the server ID by a provider of the advertising monitoring service in cooperation with the mobile operator issuing the SIM. Alternatively, the customer ID may be recovered from a SIM identifier such as the IMSI or the Integrated Circuit Card ID (ICCID). In particular, the customer ID may be obtained by applying a cryptographic algorithm to the IMSI or to the ICCID. The cryptographic algorithm may be a cryptographic not-reversible hash function such as the SHA-1 (Secure Hash Algorithm 1) function, allowing to obtain a unique and anonymous customer ID.

Advantageously, storing the customer ID and the server ID in the SIM or obtaining the customer ID from the information already stored in the SIM is more secure than gathering them from a software application. Indeed, the information contained in the SIM are not alterable because the SIM is a secure element which is controlled by an external entity and not by the customer. Moreover, the information comprised in the SIM can be transferred from a device to another device used by the customer simply by moving the SIM.

The whole set of data comprising the first set of data, the timing information, the positioning information and the customer ID are preferably sent from the user device 3, via the communication module 31 and the broadband data network 4, to the data collection server 5 (step 205) associated with the address comprised in the server ID. The communication between the communication module 31 and the data collection server 5 may be advantageously set up in a protected mode. Sending the data can be performed while the advertising message is still being played by the first user device 2, or when the advertising message play by the first user device 2 has been completed. In the latter case, the data sent to the data collection server 5 do not include data related to particular cases such as a user switching to another station or turning the playback off while listening to the advertising message as in these cases the user may not be reached by the complete advertising message.

The data collection server 5 may analyze the data and provide audience analysis reports to, e.g., the advertising agency to document audience measurements to its advertising customers as well as to the managers of radio stations A, B and C selling their advertising slots to customers and advertising agencies. For instance, an audience analysis report may contain, for each advertising ID that has been detected by the first user device 2, audience data such as the number of times a given user (who is associated with the unique customer ID) has been actually reached by, and listened to, the associated advertising message(s) during a given radio program. Besides, the audience data may comprise the sum of users actually reached by a given advertising message and their distribution among radio stations A, B and C. This sum is indicated by the number of different customer IDs received by the data collection server for the considered advertising message. Furthermore, the audience data may comprise the number of individual users (not the number of devices or the number of listening sessions) actually reached by the advertising messages broadcasted by a given radio station during a day o during one or more specific programs. Moreover, the analysis may also comprise information about the geographical area of the users actually reached by a given advertising message, and the indication of the time slots when such audience is larger, in case a same advertising message is broadcasted in different time slots during the day or even during the same radio program.

More in particular, for example, an audience analysis report for an advertising campaign aimed at the "drive time" audience may identify the geographical areas where the users actually listened to the advertising message, to verify their coincidence with the typical "commuting" road routes.

The data collection server 5 may cooperate with a database 6 for the purpose of obtaining an anonymized aggregation of data related to the users actually reached by the advertising message(s) of the considered advertising campaign. The database 6 may comprise an audience database, updated in real time, that collects audience data for each advertising campaign. The audience data may be grouped by radio station, by program within the schedule of each radio station, by time of the day, by day of the week, by location of the user (e.g. city), by mobile operator to which the customer is connected. The aggregation key is the unique and anonymous customer ID.

According to a further embodiment of the present invention, the advertising ID further comprises an identifier of a content access server 7. The content access server 7 may be managed by the advertising agency. The content access server 7 is preferably configured to provide advertising access data for accessing additional contents associated with the advertising campaign corresponding to the advertising ID. Indeed, for instance, the advertising campaign may be associated with additional video and/or audio contents (e.g. a videoclip) meant to integrate or enrich the advertising message listened to by the user. According to another example, the additional content may be a coupon that the customer may use to get a discount in case she/he decides to book or purchase the advertised product or service.

The identifier of the content access server 7 may be a pointer to an information that enables access to the content server, e.g. a pointer to a web address of the content access server 7.

According to this embodiment, when the first set of data is received by the second user device 3, ad in particular by the second processing module 32, the second processing module 32 preferably processes the advertising ID to recover the identifier of the content access server 7, for example an IP v4 address such as a.b.c.d with a-d decimal numbers from 0 to 255. Then, the second processing module 32 preferably processes the identifier of the content access server 7 to transform the identifier in the information that enables access to the content access server 7 in order to retrieve the additional contents related to the advertising campaign. At this point, once the information that enables access to the content access server 7 is available, it is preferably used by the second user device 3 to connect to the content access server 7, through the communication module 31. For example, the second processing module 32 may build a URL (Uniform Resource Locator) from the IP address of the content access server 7, and add in the URL, as parameters, the advertising ID and the unique user ID. This allows to reach a resource on the content access server 7 which provides the advertising access data in the form of URL(s) to the additional content(s), namely, for instance, a URL to a product explanatory video on a different server (e.g. a server running a service like for instance YouTube) and/or a unique URL for getting the discount coupon that is made available on another server, for instance a server that is managed by the product manufacturer. It is to be noticed that for instance in case the additional content comprises a discount coupon, the presence of the unique user ID as a parameter in the URL of the resource providing the advertising access data may allow controlling that the discount coupon is obtained only once by the allowed user.

In the exemplary case of a DAB receiver integrated in a smartphone, the connection to the content access server 7 may be made by exploiting the data connection functions of the smartphone. In the case of a stand-alone DAB receiver, this can be equipped with a local wireless connection (e.g. Bluetooth, Wi-Fi, etc.) that can be used to connect to the smartphone of the user who is listening to the DAB service, which may then connect to the content access server 7.

The advertising access data provided by the content access server 7 may comprise an address of an advertising distribution server (not illustrated in FIG. 1) configured to provide the additional contents associated with the advertising campaign. As anticipated above, the advertising distribution server may be a server that is managed by the product manufacturer on which a discount coupon may be made available.

The advertising access data provided by the content access server 7 are preferably sent to the communication module 31 of the second user device 3. They may be made available to the user by the browser module 34 via a display of the second user device 3, or they may be sent to the first processing module 23 and made available to the user via the display 23. In particular, the advertising access data may be displayed to the user. For instance, the display in the second user device 3 or, if present, in the first user device 2, may visualize the URL of an advertising distribution website which is located on the advertising distribution server. In this way, the customer may decide to navigate the advertising distribution website associated with the URL, by means of, for instance, the browser module 34 installed in the second user device 3. Alternatively, the advertising access data may be automatically processed by the browser module 34 running on the second user device 3. In this case, the second processing module 32 may automatically start the browser and open the web page of the advertising distribution website which is running on the advertising distribution server.

The user may then access and navigate the advertising distribution website and get (i.e. visualize) an additional content, such as a coupon. The interaction of the user with the advertising distribution website then configures as a traditional, interactive, web advertising process. In this way, the user may visualize the additional content, e.g. the coupon, though the browser while she/he is still listening to the advertising message or immediately at the end of said message.

It is clear from the above that the method of the present invention allows tracking an advertisement associated with an audio content on a single customer basis. Indeed, the advertising identifier of the advertising campaign considered for monitoring is uniquely associated with the customer identifier, which allows tracking the distribution of an advertising message very effectively on a single customer basis. Thanks to the present invention, it is possible to get audience report specifying the actual number of users reached by the advertising message, their geographical distribution, the time slots when audience is larger, and so on. These are clearly very important pieces of information for an advertising agency, for broadcasting station operators and/or for the seller of the advertised product, since thanks to the present invention it is possible to measure the reach and effectiveness of the advertising message and to tailor the advertising campaign on the basis of, for instance, where and when the customers are more prone to be engaged by the advertising.

Finally, the present invention also allows providing the customer with additional content enriching the advertising message, which are designed to allow the customer to interact with, for instance, a website and get more information about the advertised product. In this way, the customer engagement of the advertising campaign is more effective.

Furthermore, it is to be noticed that in case of integration of a DAB receiver with a terminal equipped with a cellular connection and display such as a smartphone or tablet, the present invention advantageously allows achieving a strong manufacturing cost efficiency thanks to reusing functional elements already present in the device (namely, the operating system, a DAB advertising management application, the browser, the display, the data connection and the SIM card) in the smartphone or tablet of the customer, thus allowing the creation of a very flexible and economically efficient solution suitable for mass-market deployment. A smartphone integrating a DAB receiver could therefore implement the present invention with no additional costs in terms of hardware, provided that the DAB functions are properly accessible by the software modules.

Finally, the method of the present invention is also economically more effective than methods based on, for instance, customer surveys, questionnaires, interviews, etc.

Indeed, the costs are sensibly lower even considering reduced groups of customers. Besides, the method of the present invention provides much more reliable and precise data about the audience reached by the advertising campaign.

In addition, the method of the present invention is able to provide real time audience measurement data as advertising IDs, together with the other data described above, can be gathered by the data collection server while the audio advertising message is being broadcasted.

As indicated above, the method of the present invention may similarly be applied to content distribution systems other than digital audio broadcasting, for instance systems based on digital audio services provided via the Internet such as podcasts or live streaming radio. For podcast, the advertising ID may be for instance transported in ID3 tags. In case of podcast, the method of the present invention furthermore allows providing data on listening habits related to a specific podcast, as the operations described above allows providing real time audience measurement data associated with the podcasting itself.

Advantageously, when the method is implemented in a smartphone device integrating a DAB receiver, such implementation is uniform across different audio distribution systems. That is, the method can be used independently from the advertising message being listened to within a DAB radio or within an audio podcast, as long as the advertising ID is provisioned within the audio program by the broadcaster or by the podcast producer/distributor.

The invention claimed is:

1. A method for monitoring an audience of an advertisement over a content distribution system, wherein said advertisement comprises an advertising message associated with digital audio content, the method comprising:
   a) inserting within the advertising message an advertising identifier associated with the advertisement and distributing the digital audio content with the advertising message to a user of the content distribution system;
   b) at a first user device configured to receive the digital audio content, playing the digital audio content with the advertising message and extracting the advertising identifier from the advertising message;
   c) at a second user device connected to the first user device and configured to communicate with a data collection server over a data communication network, retrieving a customer identifier uniquely associated with the user; and
   d) during or after the playing, sending by the second user device the customer identifier and the advertising identifier extracted from the advertising message to the data collection server to monitor the audience of the advertising message.

2. The method according to claim 1, wherein the digital audio content is associated with a station identifier, comprising an identifier of a radio station currently distributing the digital audio content, and a program identifier comprising an identifier of a radio program corresponding to the digital audio content.

3. The method according to claim 1, wherein step c) further comprises retrieving timing information comprising a date and a time of the day indicating when the advertising message actually reached the user and a device positioning information comprising localization data indicating a position of the user at the date and time of the day indicated by the timing information.

4. The method according to claim 3, wherein step d) further comprises sending, to the data collection server, the timing information and the device positioning information in association with the advertising identifier and the customer identifier.

5. The method according to claim 1, wherein the customer identifier is derived from a subscriber identity module housed in the second user device.

6. The method according to claim 5, wherein the customer identifier is recovered from an international mobile subscriber identity or an integrated circuit card id associated with the subscriber identity module.

7. The method according to claim 6, wherein the customer identifier is obtained by applying a cryptographic algorithm to the international mobile subscriber identity or the integrated circuit card id associated with the subscriber identity module.

8. The method according to claim 5, wherein step c) further comprises retrieving a server identifier comprising an address of the data collection server from the subscriber identity module housed in the second user device.

9. The method according to claim 1, wherein the customer identifier is obtained from a software application installed on the second user device and is randomly assigned to the user.

10. The method according to claim 1, wherein the advertising identifier comprises an identifier of a content access server providing advertising access data to access additional content correlated with the advertisement, and wherein the method further comprises:
    accessing the content access server by establishing a connection between the content access server and the second user device, wherein, based on establishing the connection with the content access server, the second user device receives the advertising access data from the content access server.

11. The method according to claim 10, wherein the advertising access data comprise an address of an advertising distribution server providing the additional content, and the method further comprises automatically starting a browser module of the second user device to access the advertising distribution server via the address.

12. The method according to claim 1, further comprising, at the data collection server, generating an audience analysis report with audience data associated with the advertising identifier.

13. The method according to claim 1, wherein the digital audio content is digital audio broadcasting content and wherein inserting within the advertising message an advertising identifier associated with the advertisement comprises inserting the advertising identifier in a PAD (Programme Associated Data) field of a number of audio frames transporting the digital audio broadcasting content.

14. A system for monitoring an audience of an advertisement over a content distribution system, wherein the advertisement comprises an advertising message associated with digital audio content distributed to a user of the content distribution system, the system comprising a first user device, a second user device connected to the first user device and a data collection server being configured to communicate with the second user device over a data communication network, the first user device being configured to:
    receive the digital audio content; and
    play the digital audio content with the advertising message,
    extract an advertising identifier from the advertising message, and the second user device being configured to:

retrieve a customer identifier uniquely associated with the user; and during or after the playing, send the customer identifier and the advertising identifier extracted from the advertising message to the data collection server to monitor the audience of the advertising message.

15. An apparatus for monitoring an audience of an advertisement over a content distribution system, wherein the advertisement comprises an advertising message associated with digital audio content distributed to a user of the content distribution system, the apparatus comprising a first user device and a second user device, wherein the first user device is configured to:

receive the digital audio content; and play the digital audio content with the advertising message, extract an advertising identifier from the advertising message, and the second user device is configured to:

retrieve a customer identifier uniquely associated with the user; and during or after the playing, send the customer identifier and the advertising identifier extracted from the advertising message to a data collection server to monitor the audience of the advertising message, the data collection server being configured to communicate with the second user device over a data communication network.

* * * * *